United States Patent
Green

(10) Patent No.: US 10,744,580 B2
(45) Date of Patent: Aug. 18, 2020

(54) RECIP BLADE

(71) Applicant: Black & Decker Inc., New Britain, CT (US)

(72) Inventor: Matthew C. Green, Amherst, MA (US)

(73) Assignee: Black & Decker Inc., New Britain, CT (US)

( * ) Notice: Subject to any disclaimer, the term of this patent is extended or adjusted under 35 U.S.C. 154(b) by 208 days.

(21) Appl. No.: 15/809,773

(22) Filed: Nov. 10, 2017

(65) Prior Publication Data

US 2018/0085838 A1 Mar. 29, 2018

Related U.S. Application Data

(63) Continuation of application No. 14/316,532, filed on Jun. 26, 2014, now Pat. No. 9,833,851.

(60) Provisional application No. 61/840,219, filed on Jun. 27, 2013.

(51) Int. Cl.
| | |
|---|---|
| *B23D 61/12* | (2006.01) |
| *B26B 9/02* | (2006.01) |
| *B23D 51/10* | (2006.01) |

(52) U.S. Cl.
CPC ........... *B23D 61/123* (2013.01); *B23D 51/10* (2013.01); *B23D 61/12* (2013.01); *B23D 61/125* (2013.01); *B23D 61/128* (2013.01); *B26B 9/02* (2013.01); *Y10T 83/9454* (2015.04)

(58) Field of Classification Search
CPC .... B23D 61/123; B23D 61/12; B23D 61/125; B23D 61/128; B23D 51/10; B26B 9/02; B26B 7/055

USPC .......... 83/835–855; 30/392–394, 277.4, 30/355–356
See application file for complete search history.

(56) References Cited

U.S. PATENT DOCUMENTS

| | | | | |
|---|---|---|---|---|
| 864,812 | A | * 9/1907 | Thullier | ............... B26B 9/00 30/348 |
| 1,541,307 | A | 6/1925 | Zinn | |
| 1,579,039 | A | 3/1926 | Steffan et al. | |
| 2,517,840 | A | * 8/1950 | Chatlos | ............... B26B 9/02 30/314 |
| 3,028,889 | A | 4/1962 | McCarty | |
| 3,728,792 | A | * 4/1973 | Gault | ............... B26B 7/005 30/355 |
| 4,036,236 | A | 7/1977 | Rhodes, Jr. | |

(Continued)

FOREIGN PATENT DOCUMENTS

| | | |
|---|---|---|
| FR | 789852 A1 | 11/1935 |
| FR | 2729321 A | 7/1996 |

(Continued)

OTHER PUBLICATIONS

Japanese Office Action issued in Japanese Application No. 2014-130200, dated Sep. 1, 2015 (4 pages).
Extended European Search Report issued in Application No. 140002197.3, dated Feb. 2, 2015 (6 pages).

*Primary Examiner* — Ghassem Alie
*Assistant Examiner* — Nhat Chieu Q Do
(74) *Attorney, Agent, or Firm* — Scott B. Markow

(57) ABSTRACT

A recip blade has a blade body including a cutting edge and a tang located at one end of the blade body. The tang defines an arcuate cross-sectional shape or is laminated to increase the overall thickness of the tang and, in turn, enhance the rigidity of the blade and/or reduce oscillation or whipping of the blade during cutting.

18 Claims, 6 Drawing Sheets

(56) References Cited

U.S. PATENT DOCUMENTS

| | | | |
|---|---|---|---|
| 4,543,720 A * | 10/1985 | Grunikiewicz | E04F 21/32 30/277.4 |
| 6,485,495 B1 * | 11/2002 | Jenkinson | A61B 17/1604 606/167 |
| 7,833,241 B2 | 11/2010 | Gant | |
| D664,018 S * | 7/2012 | Inkster | D8/20 |
| 8,372,077 B2 | 2/2013 | Taylor | |
| 2002/0042998 A1 | 4/2002 | Napoli | |
| 2006/0000314 A1 | 1/2006 | Henry | |
| 2009/0188367 A1 | 7/2009 | Quinn | |
| 2009/0326540 A1 | 12/2009 | Estes | |
| 2010/0069909 A1 | 3/2010 | Taylor | |
| 2010/0218655 A1 | 9/2010 | Gillette et al. | |
| 2012/0029545 A1 | 2/2012 | Nelson et al. | |
| 2013/0031791 A1 | 2/2013 | Butzen et al. | |
| 2013/0204255 A1 * | 8/2013 | Milburn | A61B 17/142 606/82 |
| 2013/0232796 A1 * | 9/2013 | Nikas | B26B 19/06 30/208 |
| 2014/0251109 A1 | 9/2014 | Bozic | |

FOREIGN PATENT DOCUMENTS

| | | |
|---|---|---|
| JP | S52-42394 U | 3/1977 |
| JP | S61-148602 U | 9/1986 |
| WO | 2013/020115 A2 | 2/2013 |
| WO | 2013/026593 A1 | 2/2013 |

* cited by examiner

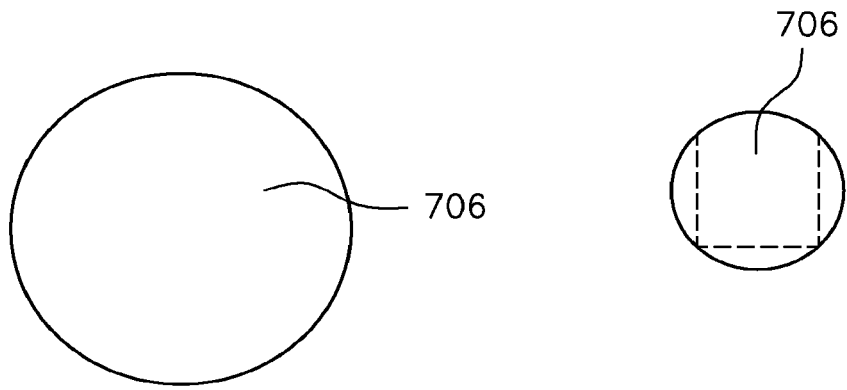
*FIG. 13*  *FIG. 14*
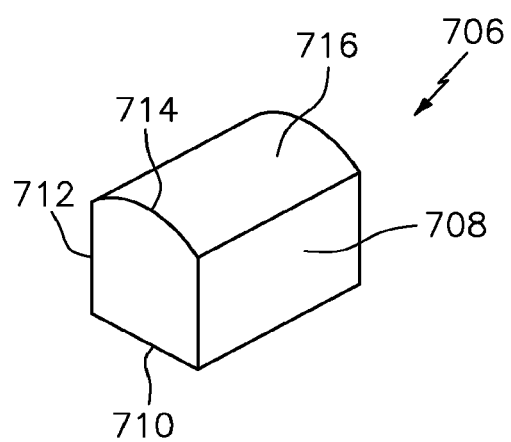
*FIG. 15*

RECIP BLADE

CROSS-REFERENCE TO RELATED APPLICATIONS

This application claims the benefit under 35 U.S.C. § 120 to U.S. patent application Ser. No. 14/316,532, titled "Recip Blade," filed Jun. 26, 2014, which claimed priority under 35 U.S.C. § 119 to U.S. Provisional Patent Application No. 61/840,219, filed Jun. 27, 2013, and titled "Recip Blade," the entire contents of each of which is hereby expressly incorporated herein by reference for all purposes.

FIELD OF THE INVENTION

The present invention relates to recip blades, and more particularly, to recip blades with tangs defining arcuate cross-sectional shapes, laminated tangs, tangs with shapes or configurations that increase the overall thicknesses of the tangs, and tangs with features that increase the stiffness of the tangs and/or blade bodies, and/or that reduce oscillations or vibrations in the blade bodies during cutting.

BACKGROUND OF THE INVENTION

Typical known recip blades include tangs extending from the blade bodies and having a linear cross-camber. During cutting, the distal portions of such blades tend to oscillate or whip from side to side or laterally. When the oscillating or whipping portion of the blade enters a work piece, the sides of the teeth engage the kerf and are subjected to lateral loads corresponding to the level of oscillation or whipping. This type of lateral teeth loading and/or the oscillation or whipping of blades having a tang with a linear cross-camber can be unproductive and can negatively impact blade life.

It is an object of the invention to overcome one or more of the above-described drawbacks and/or disadvantages of the prior art.

SUMMARY OF THE INVENTION

In accordance with one aspect, the present invention is directed to a recip blade comprising a blade body, which includes a cutting edge, and a tang located at one end of the blade body and defining an arcuate cross-sectional shape.

In some embodiments, the cross-sectional shape of the tang defines a single arc, which is bow-shaped. Alternatively, in some embodiments, the cross-sectional shape of the tang defines a plurality of arcs. In some such embodiments, the tang defines two arcs laterally spaced and facing in substantially opposite directions relative to each other such that the tang is approximately S-shaped in cross-section. In some such embodiments, the cross-sectional shape of the tang defines sequentially a first arc, a second arc, and a third arc that are laterally spaced relative to each other. The first arc and the third arc extend in a first direction and the second arc extends in a second direction that is substantially opposite to the first direction such that the tang defines a wavy or wavelike shape in cross-section.

In some embodiments, the tang defines a width, and the arcuate cross-sectional shape extends throughout a substantial portion of the width of the tang, and preferably extends continuously throughout such substantial portion of the width. In some such embodiments, the arcuate cross-sectional shape preferably extends throughout at least about ⅓ the width of the tang, more preferably extends throughout at least about ½ the width of the tang, even more preferably extends throughout at least about ⅔ the width of the tang, and even more preferably extends throughout at least about ¾ the width of the tang.

In some embodiments, the tang defines a length, and the arcuate cross-sectional shape extends throughout a substantial portion of the length of the tang, and preferably extends continuously throughout such substantial portion of the length. In some such embodiments, the arcuate cross-sectional shape preferably extends throughout at least about ⅓ the length of the tang, more preferably extends throughout at least about ½ the length of the tang, even more preferably extends throughout at least about ⅔ the length of the tang, and even more preferably extends throughout at least about ¾ the length of the tang.

In some embodiments, the recip blade defines a junction between the tang and the blade body, and the arcuate cross-sectional shape extends through the junction of the tang and the blade body. In some such embodiments, the arcuate cross-sectional shape transitions from the arcuate shape to a substantially planar shape at the junction of the tang and the blade body. Alternatively, in some such embodiments, the arcuate cross-sectional shape extends over the junction of the tang and the blade body and terminates in a portion of the blade body adjacent to the tang. In the embodiments where the arcuate cross-sectional shape extends over the junction of the tang and the blade body, and terminates in a portion of the blade body adjacent to the tang, the arcuate cross-sectional shape preferably terminates within about ⅓ of an inch from the junction of the tang and the blade body, and more preferably the arcuate cross-sectional shape terminates within about ¼ of an inch from the junction of the tang and blade body.

In some embodiments, the recip blade further comprises a tang stem located on an opposite side of the tang relative to the blade body. In some embodiments, the tang is a lamination or is laminated. The lamination can include two layers, which are formed of two different materials, and the lamination can be configured to dampen vibrations.

In accordance with another aspect, the present invention is directed to a recip blade comprising a blade body including a cutting edge, and a tang located at one end of the blade body. The tang includes means for increasing the overall thickness of the tang. In some such embodiments, the means for increasing the overall thickness of the tang is an arcuate cross-sectional shape of the tang.

In accordance with yet another aspect, the present invention is directed to a recip blade comprising a blade body including a cutting edge and defining a distal end, a tang located at an opposite end of the blade body relative to the distal end, a tang stem located on an opposite side of the tang relative to the blade body, and means for moving a bend plane of the recip blade away from at least one of the tang stem and the tang. In some embodiments of the present invention, the means for moving a bend plane of the recip blade away from at least one of the tang stem and the tang is an arcuate cross-sectional shape of the tang.

In accordance with another aspect, the present invention is directed to a recip blade comprising a blade body including a cutting edge, and a laminated tang located at one end of the blade body. In some embodiments of the present invention, the laminated tang is configured to dampen vibration. In some embodiments, at least one lamina is affixed to the tang. In some embodiments, a single lamina or layer of lamination is affixed to the tang. In some such embodiments, the laminated tang is comprised of at least one material, and the material is copper, nickel, and/or steel. In some such embodiments, the laminated tang includes two layers or lamina affixed thereto. In some such embodiments, the two layers are comprised of either the same material or of different materials, and the one or more materials is copper, nickel, and/or steel. In some such embodiments, one of the layers of the lamination is copper and/or nickel, and another of the layers of the lamination is steel.

One advantage of the present invention is that the arcuate cross-sectional shape of the tang, the laminated tang, or other means increases the overall thickness of the tang. Yet another advantage is that the arcuate cross-sectional shape of the tang, the laminated tang, or like means can move a bend plane of the recip blade away from at least one of the tang stem and the tang, can reduce the oscillating or whipping encountered with the above-described prior art recip blades, and/or can increase blade life.

Other objects and advantages of the present invention, and/or objects and advantages of the currently preferred embodiments thereof, will become more readily apparent in view of the following detailed description of the currently preferred embodiments and the accompanying drawings.

BRIEF DESCRIPTION OF THE DRAWINGS

FIG. 13 is a cross-sectional view of a round bar used to form a portion of the die included in the apparatus of FIG. 12;

FIG. 14 is another cross-sectional view of the round bar indicating the desired planer height and width of the bar of FIG. 13; and FIG. 15 is a perspective view of the die formed from the bar of FIGS. 13 and 14.

DETAILED DESCRIPTION OF EMBODIMENTS OF THE INVENTION

Figure 1:
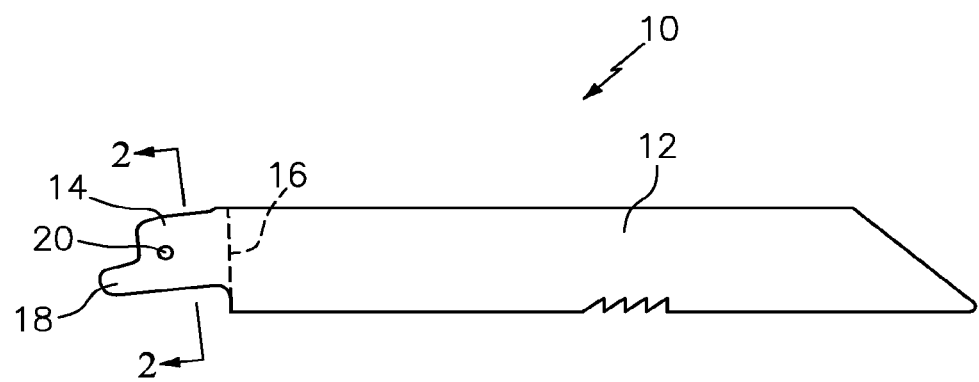
FIG. 1 is a side view of a known recip blade.
Figure 2:
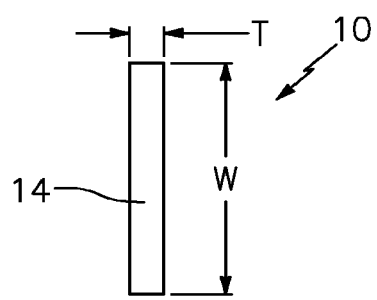
FIG. 2 is a cross-sectional view of the known recip blade of FIG. 1 taken along line 2-2 thereof.

In FIG. 1, a known recip blade is indicated generally by the reference numeral 10. The recip blade 10 comprises a blade body 12 and a tang 14 located at one end of the blade body 12 and forming a junction 16 with the blade body 12 at the one end of the blade body 12. The tang 14 includes a tang stem 18 and a tang aperture 20 extending through the tang 14. As can be seen in FIG. 2, the tang 14 extends linearly, as viewed in cross-section, from the blade body 12. The tang 14 can have, for example, an overall thickness of about 0.035 inch and a width of about 0.500 inch.

Figure 3:
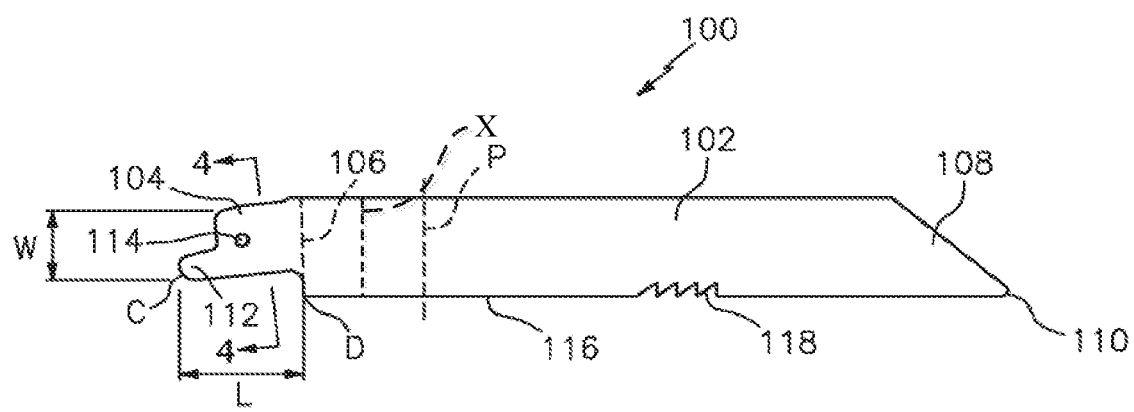
FIG. 3 is a side view of an embodiment of a recip blade of the present invention.

In FIG. 3, an embodiment of a recip blade representing the present invention is indicated generally by reference numeral 100. The recip blade 100 comprises a blade body 102 and a tang 104, which is located at one end of the blade body 102 and forms a junction 106 with the blade body 102 at the one end of the blade body 102. The blade body 102 includes a distal portion 108, which is located at an opposite end of the blade body 102 relative to the tang 104 and defines a tip 110. The tang 104 defines a length L and a width W, and includes a tang stem 112 and a tang aperture 114 extending through the tang 104. The recip blade 100 includes a cutting edge 116 that extends along the blade body 102 between the tang 104 and the tip 110.

In some embodiments, the recip blade 100 is a metal cutting recip blade, and the cutting edge 116 includes a plurality of teeth shown typically at 118 configured for cutting metal work pieces. Although the cutting teeth 118 are shown at only one discrete portion of the cutting edge 116, they preferably extend along the cutting edge 116 or respective side of the blade body 102. In some embodiments, the tang stem 112 is a lamination of two or more layers of the same or different materials, or is laminated with one or more of the same or different materials, to dampen vibrations. The material may be copper, nickel, and/or steel. However, as may be recognized by those of ordinary skill in the pertinent art based on the teachings herein, the layers may be defined by any material that is known or may become known.

Figure 4:
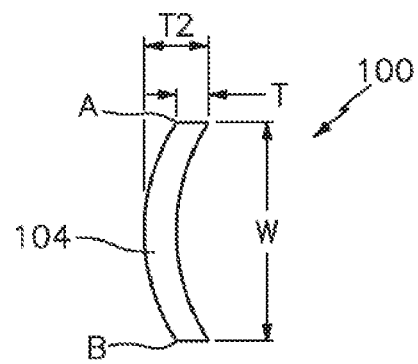
FIG. 4 is a cross-sectional view of the recip blade of FIG. 3 taken along line 4-4 thereof.

As shown in FIG. 4, the tang 104 defines an arcuate cross-sectional shape. The arcuate shape effectively moves a bend plane P (see FIG. 3) of the recip blade 100 away from the tang 104 and tang stem 112 to, in turn, increase the stiffness and/or reduce vibrations and/or oscillations in the blade body 102 during cutting. The tang 104 defines an arc which is bow-shaped. In an unbent, linear state (e.g., similar to the state shown in FIG. 2), the tang 104, can have, for example, a thickness T of about 0.035 inch and a width W of about 0.500 inch. However, as depicted in FIG. 4, in a bent or arcuate state, the overall thickness T2 of the tang 104 is significantly greater than the thickness T. This arcuate configuration enhances the rigidity of the recip blade 100 and can, in turn, reduce the oscillations or whipping encountered in the above-described prior art recip blades during use. In the illustrated embodiment, the thickness T is about 0.035 inch and the overall thickness T2 is about 0.048 inch. However, as may be recognized by those of ordinary skill in the pertinent art based on the teachings herein, these dimensions are only exemplary, and the tangs of the recip blades of the present invention may take any of numerous different thicknesses T and/or overall thicknesses T2, and the differences between the overall thicknesses T2 and the thicknesses T may differ from that described.

In some embodiments, the arcuate cross-sectional shape is an uninterrupted or continuous curve that extends from one point A to another point B throughout a substantial portion of the width W of the tang 104 and substantially without any flats or planar portions formed within or between the arcuate cross-sectional shape(s). In some such embodiments, the arcuate cross-sectional shape extends throughout at least about one third (⅓) the width W of the tang 104, more preferably, the arcuate cross-sectional shape extends throughout at least about one half (½) the width W of the tang 104, even more preferably, the arcuate cross-sectional shape preferably extends throughout at least about two thirds (⅔) the width W of the tang 104, and even more preferably, the arcuate cross-sectional shape extends throughout at least about three fourths (¾) the width W of the tang 104.

In some embodiments, the arcuate cross-sectional shape is an uninterrupted or continuous curve that extends from a point C to a point D throughout a substantial portion of the length L of the tang 104 and without any flats or planar portions formed between, within or otherwise interrupting the arcuate cross-sectional shape(s). In some such embodiments, the arcuate cross-sectional shape extends throughout at least about one third (⅓) the length L of the tang 104, more preferably, the arcuate cross-sectional shape extends throughout at least about one half (½) the length L of the tang 104, more preferably, the arcuate cross-sectional shape extends throughout at least about two thirds (⅔) the length L of the tang 104, and even more preferably, the arcuate cross-sectional shape extends throughout at least about three fourths (¾) the length L of the tang 104. In some embodiments, the arcuate cross-sectional shape transitions to a substantially planar shape at the junction 106 between the tang 104 and the blade body 102. In other example embodiments, the arcuate cross-sectional shape extends over the junction 106 of the tang 104 and the blade body 102, and terminates in a portion X of the blade body adjacent to the tang.

Figure 5:
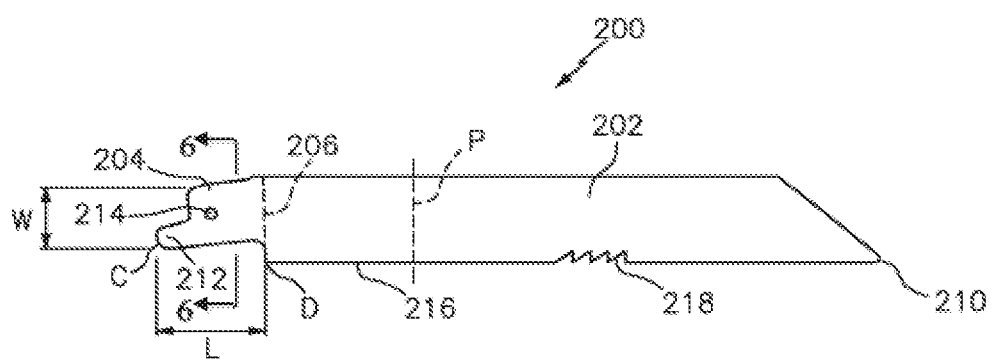
FIG. 5 is a side view of another embodiment of a recip blade of the present invention.
Figure 6:
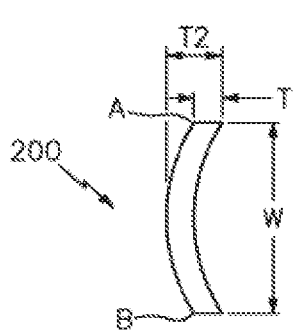
FIG. 6 is a cross-sectional view of the recip blade of FIG. 5 taken along line 6-6 thereof.

In FIGS. 5 and 6, another embodiment of a recip blade of the present invention is indicated generally by the reference numeral 200. The recip blade 200 is substantially the same as the recip blade 100 described above, and therefore like reference numerals preceded by the numeral "2" instead of the numeral "1" are used to indicate like elements. In FIGS. 5 and 6, the arcuate cross-sectional shape extends through, or extends over, a junction 206 of the tang 204 and the blade body 202, and terminates in a portion of the blade body 202 adjacent to the tang 204. In some such embodiments, the arcuate cross-sectional shape terminates preferably within about ⅓ of an inch from the junction of the tang 204 and the blade body 202, and more preferably, the arcuate cross-sectional shape terminates within about ¼ of an inch from the junction 206 of the tang 204 and the blade body 202. However, as may be recognized by those of ordinary skill in the pertinent art based on the teachings herein, these dimensions are only exemplary and may be changed as desired or otherwise as may be required.

Figure 7:
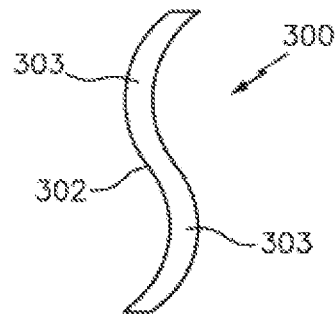
FIG. 7 is a cross-sectional view of another embodiment of a tang of a recip blade of the present invention.

In FIG. 7 another embodiment of a recip blade of the present invention is indicated generally by the reference numeral 300. The recip blade 300 is substantially similar to the recip blades 100 and 200 described above, and therefore like reference numerals preceded by the numeral "3" instead of the numerals "1" or "2", are used to indicate like elements. The recip blade 300 differs from the recip blades 100 and 200 in that the cross-sectional shape of the tang 302 defines a plurality of arcs 303, 305. In the illustrated embodiment, the cross-sectional shape of the tang 302 is defined by two arcs 303, 305 that are laterally spaced relative to each other, and face in substantially opposite directions so as to form substantially an S-shape in cross section.

Figure 8:
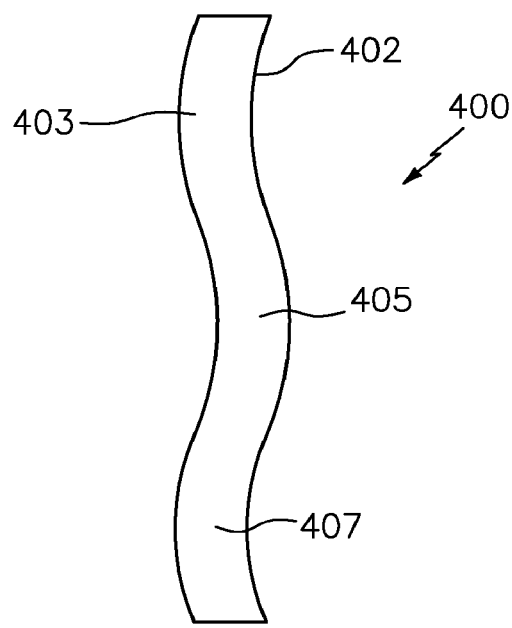
FIG. 8 is a cross-sectional view of another embodiment of a tang of a recip blade of the present invention.

In FIG. 8 another embodiment of a recip blade of the present invention is indicated generally by the reference numeral 400. The recip blade 400 is substantially similar to the recip blades 100, 200, and 300 described above, and therefore like reference numerals preceded by the numeral "4" instead of the numerals "1," "2," or "3," respectively, are used to indicate like elements. The recip blade 400 differs from the recip blades 100, 200, and 300 in that the cross-sectional shape of the tang 402 has at least two arcs extending in one direction and at least one arc extending in an opposite direction. In the illustrated embodiment, the cross-sectional shape of the tang 402 is defined by a first arc 403, a second arc 405, and a third arc 407 that are laterally spaced relative to each other. The first arc 403 and the third arc 407 extend in a first direction, and the second arc 405 extends in a second direction that is substantially opposite to the first direction such that the tang 402 has a wavy or wavelike shape in cross-section.

Figure 9:
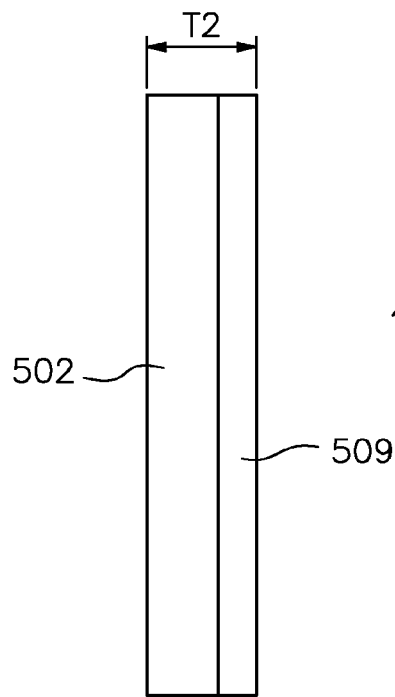
FIG. 9 is a cross-sectional view of another embodiment of a tang of a recip blade of the present invention.

In FIG. 9 another embodiment of a recip blade of the present invention is indicated generally by the reference numeral 500. The recip blade 500 is substantially similar to the recip blades 100, 200, 300, and 400 described above, and therefore like reference numerals preceded by the numeral "5" instead of the numerals "1," "2," "3," or "4," respectively, are used to indicate like elements. The recip blade 500 differs from the recip blades 100, 200, 300, and 400 in that the tang 502 does not define an arcuate shape and the overall cross-sectional thickness T2 of the tang 502 is increased by bonding a lamina or layer of lamination 509 to the tang 502. One advantage of the laminated tang 502 is that it can dampen vibrations. The lamina or layer of lamination 509 is defined by a single material or by a combination of different materials. The material defining the layer of lamination 509 may be copper, nickel, and/or steel. However, as may be recognized by those of ordinary skill in the pertinent art based on the teachings herein, the layer of lamination 509 may be defined by any material or combination of materials that is known or may later become known.

Figure 10:
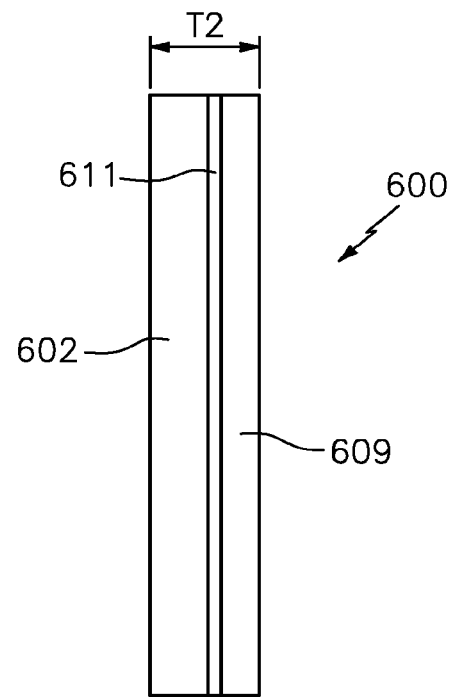
FIG. 10 is a cross-sectional view of another embodiment of a tang of a recip blade of the present invention.

In FIG. 10, another embodiment of a recip blade of the present invention is indicated generally by the reference numeral 600. The recip blade 600 is substantially similar to the recip blades 100, 200, 300, 400, and 500 described above, and therefore like reference numerals preceded by the numeral "6" instead of the numerals "1," "2," "3," "4," or "5," respectively, are used to indicate like elements. The recip blade 600 differs from the recip blade 500 in that the overall thickness T2 of the tang 602 is increased by the addition of a second lamina or laminated layer. In the illustrated embodiment, two lamina or layers of lamination 609, 611 are affixed to the tang 602. As with the previously described embodiment, the laminated tang 602 can reduce vibrations during operation of the recip blade 600. The lamina or layers of lamination 609, 611 are formed of the same material or of different materials. The material forming the layer(s) of the lamination 609, 611 include copper, nickel, and/or steel. In one such embodiment, the layers of lamination 609, 611 are combined such that a layer of copper or nickel is affixed to a layer of steel and the two layers of lamination 609, 611 are affixed to the tang 602. The lamina 609, 611 are affixed to each other and to the tang 602 in any of numerous different ways that are currently known, or that later become known, including by bonding, such as with an epoxy or adhesive, welding, brazing or any of numerous different ways of laminating the material employed that are currently known, or that later become known. In addition, the materials used to form the lamina 609, 611 may be any of numerous different metals or combinations or metals, or non-metallic or engineered materials, that are currently known, or that later become known.

Figure 11:
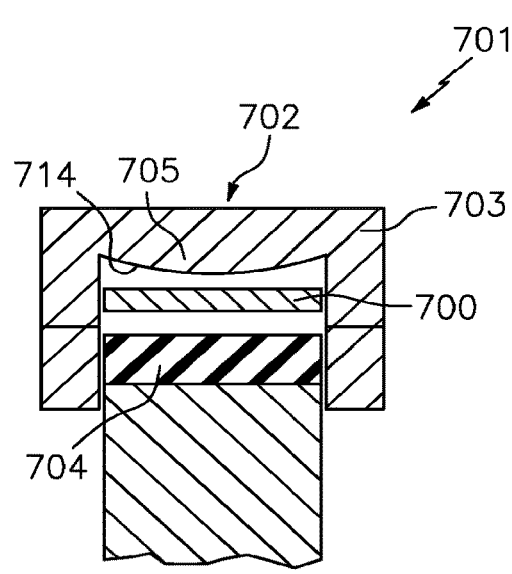
FIG. 11 is a partially exploded, cross-sectional schematic view of an embodiment of an apparatus for forming arcuate shapes in the recip blades.
Figure 12:
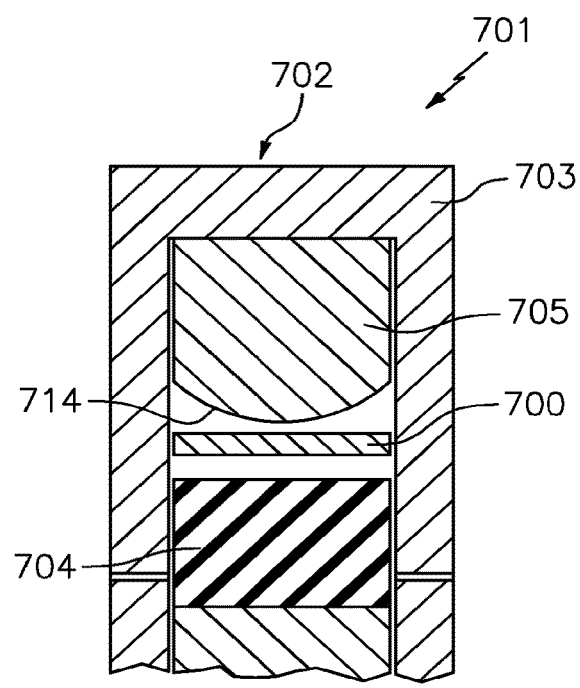
FIG. 12 is a partially exploded, cross-sectional schematic view of another embodiment of an apparatus for forming arcuate shapes in the recip blades.

FIGS. 11 and 12 illustrate embodiments of an apparatus 701 for forming the arcuate shapes in the tangs of the recip blades. The recip blade 700 shown in FIGS. 11 and 12 is substantially the same as any of the recip blades 100, 200, 300, 400, 500, and 600 described above. The apparatus 701 includes a die 702 and a rubber block 704 that is spaced away from the die 702. As will be described in more detail below, the die 702 is shaped to form the desired arcuate cross-sectional shape in the recip blade 700. In order to form the arcuate cross-sectional shape in a tang, or tang and blade body of the recip blade 700, the recip blade 700 is arranged between the die 702 and the rubber block 704. The rubber block 704 is driven into engagement with the recip blade 700 to press the recip blade 700 against the die 702 and conform the tang or the tang and adjacent portion of the blade body 700 to the shape of the die 702. As may be recognized by those of ordinary skill in the pertinent art, the rubber block 704 may be driven into the recip blade 700 and die 702 a plurality of times to achieve the desired arcuate shape. If desired, the die 702 may be driven toward the rubber block 704, or both the rubber block 704 and the die 702 may be moved toward each other.

As shown in FIGS. 11 and 12, the die 702 includes a housing 703 and a form tooling 705. The form tooling 705 of the die 702 defines a curved or arcuate forming surface 714 that receives thereon the recip blade 700 to form the arcuate cross-sectional shape in the tang or the tang and adjacent portion of the blade body. FIGS. 13-15 illustrate formation of the form tooling 705 of the die 702 of FIG. 12 from a metal round bar 706 (see FIGS. 13 and 14) that defines a diameter. As shown in FIG. 15, the round bar 706 is planarized (e.g., along the broken lines shown in FIG. 14) to form the form tooling 705 of the die 702, which has three substantially planar sides 708, 710, 712 and the curved crown or forming surface 714 on one side 716.

As may be recognized by those of ordinary skill in the pertinent art based on the teachings herein, numerous changes and modifications may be made to the above-described and other embodiments of the present invention without departing from its scope as defined in the claims. For example, other shapes or structural deformations can be formed in place of or in addition to the arcuate shape(s) or laminated tangs to aid in damping the blade and/or reduce oscillations or whipping of a blade body during use. Further, one or more features disclosed in connection with one embodiment can be used alone or in combination with one or more features of one or more other embodiments. As one such example, the tang or tangs (e.g., if the blade includes two tangs at opposite ends of the blade relative to each other) can define one or both of an arcuate cross-sectional shape and a lamination where the lamination may include any desired number of layers of the same or different materials. In addition, the blade or any of the components or features thereof may be formed of any of numerous different materials, or combinations of materials, the cutting edge or edges (e.g., if the blade includes two cutting edges located on opposites sides of the blade relative to each other), and the tang or tangs, may take any of numerous different forms or configurations, that are currently known, or that later become known. Further, the apparatus used to form the arcuate shapes in the tangs or tangs and adjacent blade bodies can take any of numerous different configurations that are currently known, or that later become known. Accordingly, this detailed description of embodiments is to be taken in an illustrative, as opposed to a limiting sense.

What is claimed is:

1. A recip blade usable with a powered reciprocating saw, the recip blade comprising:
    a substantially planar blade body comprising a cutting edge and extending along a blade axis;
    a tang located at one end of the blade body and defining a cross-sectional shape that is curved continuously along at least a portion of a length of the tang and transverse to the blade axis across at least a portion of a width of the tang such that the tang is configured to be received in a blade holder of the powered reciprocating saw, the cross-sectional shape comprising:
    a first arc-shaped portion having a first arcuate shape facing in a first direction; and
    a second arc-shaped portion having a second arcuate shape continuous with the first arc-shaped portion and facing in a second direction opposite the first direction,
    wherein the tang has an upper edge and a lower edge with the first-arc-shaped portion closer to the upper edge and the second arc-shaped portion closer to the lower edge.

2. The recip blade of claim 1, wherein the first arcuate shape and the second arcuate shape are substantially the same.

3. The recip blade of claim 1, wherein the cross-sectional shape is substantially s-shaped.

4. The recip blade of claim 1, wherein the cross-sectional shape further comprises a third arc-shaped portion.

5. The recip blade of claim 4, wherein the third arc-shaped portion has a third arcuate shape facing in the first direction.

6. The recip blade of claim 1, wherein the tang further comprises a tang aperture extending through the tang for coupling the tang to a reciprocating saw.

7. The recip blade of claim 1, further comprising a tang stem located on an opposite side of the tang relative to the blade body and extending out from the tang.

8. The recip blade of claim 1, further comprising:
    at least one layer of lamination affixed to the tang.

9. The recip blade of claim 8, wherein the at least one layer of lamination is at least one of copper, nickel, and steel.

10. The recip blade of claim 8, wherein the at least one layer comprises a first layer of lamination affixed to the tang and a second layer of lamination affixed to the tang.

11. The recip blade of claim 10, wherein the first layer of lamination is made of a first material and the second layer of lamination is made of a second material different from the first material.

12. The recip blade of claim 1, wherein the tang is configured to move a bend plane of the recip blade away from the tang.

13. The recip blade of claim 1, an entirety of the length of the blade body is substantially planar.

14. The recip blade of claim 1, wherein the cross-sectional shape of the tang is curved continuously across an entirety of the width of the tang.

15. The recip blade of claim 1, wherein the cross-section shape of the tang is curved continuously along an entirety of the length of the tang.

16. The recip blade of claim 1, further comprising a transition region in which the curved cross-sectional shape transitions to a substantially planar shape.

17. The recip blade of claim 16, wherein the transition region is disposed in the tang adjacent a junction between the blade body and the tang such that a portion of the tang adjacent the blade body is substantially planar.

18. The recip blade of claim 16, wherein the transition region is disposed in the blade body adjacent a junction between the blade body and the tang such that a portion of the blade body adjacent the tang has the curved cross-sectional shape.

* * * * *